(12) United States Patent
Reading et al.

(10) Patent No.: US 11,731,279 B2
(45) Date of Patent: Aug. 22, 2023

(54) SYSTEMS AND METHODS FOR AUTOMATED TUNING OF ROBOTICS SYSTEMS

(71) Applicant: Samsung Electronics Company, Ltd., Gyeonggi-do (KR)

(72) Inventors: Dean N. Reading, Sunnyvale, CA (US); Sergio Perdices-Gonzalez, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 141 days.

(21) Appl. No.: 17/229,724

(22) Filed: Apr. 13, 2021

(65) Prior Publication Data
US 2022/0324116 A1 Oct. 13, 2022

(51) Int. Cl.
*B25J 9/16* (2006.01)
*B25J 13/08* (2006.01)

(52) U.S. Cl.
CPC ........... *B25J 9/1692* (2013.01); *B25J 9/1664* (2013.01); *B25J 13/087* (2013.01); *B25J 13/088* (2013.01)

(58) Field of Classification Search
CPC ...... B25J 9/1692; B25J 9/1664; B25J 13/087; B25J 13/088; B25J 9/1653; B25J 9/1651; B25J 9/1661; B25J 9/1674; B25J 9/1697; B25J 9/1694; B25J 19/06; B25J 19/068; B25J 9/1641; A61B 2018/00726; A61B 2018/0072; A61B 2018/00714; A61B 2018/00696; G05B 2219/15126; G05B 2219/25399; G05B 2219/49071; G05B 2219/25098; G05B 2219/41005; G05B 2219/41006; G05B 2219/41011; G05B 2219/41029; G05B 2219/41095; G05B 2219/41163; G05B 2219/41162; G05B 2219/42018; G05B 2219/23399;
(Continued)

(56) References Cited

U.S. PATENT DOCUMENTS

| | | | |
|---|---|---|---|
| 5,994,844 A * | 11/1999 | Crawford | H05B 39/042 362/4 |
| 6,442,451 B1 | 8/2002 | Lapham | |

(Continued)

FOREIGN PATENT DOCUMENTS

| | | |
|---|---|---|
| CN | 109921680 | 6/2019 |
| EP | 1705541 B1 | 7/2010 |

(Continued)

OTHER PUBLICATIONS

Yaskawa Smart Series Brochure, pp. 1-4, Mar. 2021.
(Continued)

*Primary Examiner* — Abby Y Lin
*Assistant Examiner* — Esvinder Singh

(57) ABSTRACT

In one embodiment, a method includes by a robotic system: sending, by an automatic tuning controller, driving commands to actuators of the robotic system, performing, for each of the actuators, one or more measurements of an actual pose of the respective actuator in response to the driving commands, generating, for each of the actuators, one or more configuration parameters for the respective actuator based on the one or more measurements, and storing the configuration parameters for the actuators in a data store of the robotic system.

20 Claims, 13 Drawing Sheets

(58) Field of Classification Search
CPC .......... G05B 2219/49087; G05B 2219/31103; G05B 11/38; G05B 11/42; G05B 13/024
See application file for complete search history.

(56) References Cited

U.S. PATENT DOCUMENTS

| | | | |
|---|---|---|---|
| 8,676,381 B2 | 3/2014 | Kwon | |
| 9,533,411 B2 | 1/2017 | Jacobsen | |
| 10,246,152 B2 | 4/2019 | Takagi | |
| 10,661,398 B2 | 5/2020 | Isobe | |
| 10,765,537 B2 | 9/2020 | Smith | |
| 2007/0086755 A1* | 4/2007 | Dang | H02P 5/46 388/804 |
| 2010/0262289 A1 | 10/2010 | Hsu | |
| 2011/0022234 A1 | 1/2011 | Meyer | |
| 2013/0253419 A1* | 9/2013 | Favreau | G05B 19/40 318/599 |
| 2014/0107841 A1 | 4/2014 | Danko | |
| 2016/0016309 A1 | 1/2016 | Swift | |
| 2017/0015004 A1 | 1/2017 | Osaka | |
| 2017/0258549 A1 | 9/2017 | Tamura | |
| 2018/0318023 A1 | 11/2018 | Griffiths | |
| 2019/0070762 A1 | 3/2019 | Altonen | |
| 2019/0113904 A1 | 4/2019 | Iijima | |
| 2019/0203822 A1 | 7/2019 | Antonello | |
| 2020/0001450 A1 | 1/2020 | Smith | |
| 2020/0070346 A1* | 3/2020 | Oaki | B25J 9/1664 |
| 2020/0078947 A1 | 3/2020 | Wang | |
| 2020/0086488 A1 | 3/2020 | Sato | |
| 2020/0215692 A1 | 7/2020 | Pivac | |
| 2020/0230818 A1* | 7/2020 | Lee | B25J 9/1692 |
| 2020/0262082 A1 | 8/2020 | Schoessler | |
| 2021/0036690 A1* | 2/2021 | Tang | G11C 29/023 |
| 2021/0114217 A1 | 4/2021 | Kikuchi | |
| 2021/0316451 A1 | 10/2021 | Kumar | |
| 2022/0061934 A1 | 3/2022 | Sen | |
| 2022/0088780 A1 | 3/2022 | Abdul-hadi | |
| 2022/0126440 A1* | 4/2022 | Mizobe | B25J 9/163 |
| 2022/0175472 A1 | 6/2022 | Brisson | |
| 2022/0305646 A1* | 9/2022 | Jain | B25J 9/163 |

FOREIGN PATENT DOCUMENTS

| | | | |
|---|---|---|---|
| JP | H 11-063119 A | | 3/1999 |
| JP | 3633760 | | 3/2005 |
| JP | 2005284828 A | * | 10/2005 |
| JP | 2007-141189 A | | 6/2007 |
| JP | 5758777 | | 6/2015 |
| JP | 2016-035677 A | | 3/2016 |
| KR | 20150109286 | | 10/2015 |
| KR | 10-1640931 B1 | | 7/2016 |
| KR | 10-2016-0139973 A | | 12/2016 |
| KR | 102025100 | | 9/2019 |
| KR | 10-2020-0064405 A | | 6/2020 |
| KR | 1020200081407 | | 7/2020 |
| WO | WO 2020-049152 | | 3/2020 |

OTHER PUBLICATIONS

Gealy, David V., Stephen McKinley, Brent Yi, Philipp Wu, Phillip R. Downey, Greg Balke, Allan Zhao et al. "Quasi-direct drive for low-cost compliant robotic manipulation." In 2019 International Conference on Robotics and Automation (ICRA), pp. 437-443. IEEE, 2019, Apr. 11, 2019.
AVID CNC Pro4848 CNC Assembly Instructions, Section 4: Rack and Pinion Drive pp. 189-242, May 2020.
PCT Search Report in PCT/KR2022/004212, dated Jul. 4, 2022.
PCT Written Opinion in PCT/KR2022/004212, dated Jul. 4, 2022.
Non-final Office Action in U.S. Appl. No. 17/215,990, dated Dec. 5, 2022.
PCT Search Report in PCT/KR2022/005027, dated Jul. 26, 2022.
PCT Written Opinion in PCT/KR2022/005027, dated Jul. 26, 2022.
PCT Search Report in PCT/KR2022/003514, dated Jun. 16, 2022.
PCT Written Opinion in PCT/KR2022/003514, dated Jun. 16, 2022.
Non-final Office Action in U.S. Appl. No. 17/216,338, dated Dec. 19, 2022.
Notice of Allowance in U.S. Appl. No. 17/215,990, dated Mar. 15, 2023.
Notice of Allowance in U.S. Appl. No. 17/216,338, dated Mar. 29, 2023.

* cited by examiner

SYSTEMS AND METHODS FOR AUTOMATED TUNING OF ROBOTICS SYSTEMS

TECHNICAL FIELD

This disclosure relates generally to robotics, and in particular relates to automated tuning of robotics system.

BACKGROUND

A robot is a machine, especially one programmable by a computer, capable of carrying out a complex series of actions automatically. Robots may be guided by an external control device or the control may be embedded within. Robots may be constructed on the lines of human form, but most robots are machines designed to perform a task with no regard to their aesthetics. Robots may be autonomous or semi-autonomous and range from humanoids to industrial robots, medical operating robots, patient assist robots, dog therapy robots, collectively programmed swarm robots, UAV drones, and even microscopic nano robots. By mimicking a lifelike appearance or automating movements, a robot may convey a sense of intelligence or thought of its own.

The branch of technology that deals with the design, construction, operation, and application of robots, as well as computer systems for their control, sensory feedback, and information processing is robotics. These technologies deal with automated machines that can take the place of humans in dangerous environments or manufacturing processes, or resemble humans in appearance, behavior, or cognition.

DESCRIPTION OF EXAMPLE EMBODIMENTS

Robotic System Overview

Figure 1:
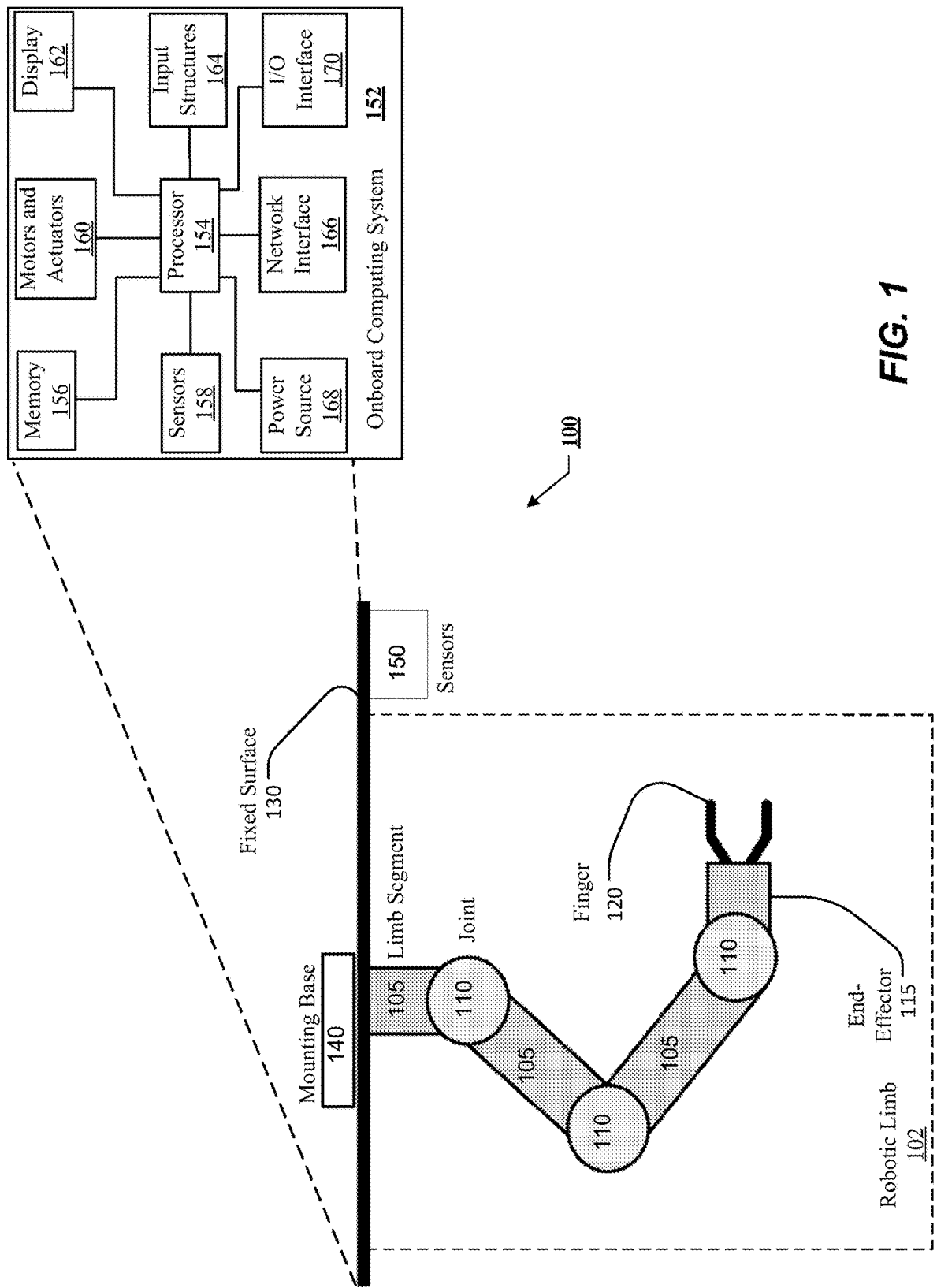
FIG. 1 illustrates an example robotic limb and apparatus.

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

In particular embodiments, a robotic system 100 may include a robotic limb that may perform operations to provide services to one or more users in different tasks such as cooking, gardening, painting, etc. Robotic limb 102 may include any suitable combination of one or more limb segment 105, joint 110, and end-effector 115. In some embodiments, robotic limb 102 may further include one or more manipulators. As an example and not by way of limitation, this manipulator may include one or more fingers 120, a suction-based gripper, or a jammable-based gripper. In some embodiments, robotic limb 102 may be connected at one end to a fixed surface 130 via mounting base 140, which may be a low-profile mounting base. As an example and not by way of limitation, this fixed surface may include a wall, a ceiling, a cabinet, a workbench, etc. In some embodiments, robotic limb 102 may be associated with one or more external sensors 150. As an example and not by way of limitation, an external RGB camera may be mounted on the mounting base 140 to capture movement of the robotic limb 102. As further depicted by FIG. 1, the robotic system 100 may include an onboard computing system 152 that may be utilized for the operation of the robotic limb 102, in accordance with the presently disclosed embodiments. The onboard computing system may track multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb. In particular embodiments, while the onboard computing system 152 is shown separate from the robotic limb, one or more components of the onboard computing system 152 may be located within the robotic limb 102. As an example and not by way of limitation, one or more motors and actuators 160 may be enclosed in the joint 110 section of the robotic limb 102. As another example and not by way of limitation, the power source 168 may be located within the mounting base 140. In particular embodiments, one or more components of the robotic system 100 may be included in another component of the robotic system 100. As an example and not by way of limitation, while sensors 150 are shown to be separate from the robotic limb 102, sensors 150 may be included in one or more components of the robotic limb 102.

For example, in some embodiments, the onboard computing system 152 may include, among other things, one or more processor(s) 154, memory 156, sensors 158, one or more motors and actuators 160, a display 162, input structures 164, network interfaces 166, a power source 168, and an input/output (I/O) interface 170. It should be noted that FIG. 1 is merely one example of a particular implementation and is intended to illustrate the types of components that may be present in the robotic system 100. As depicted, the one or more processor(s) 154 may be operably coupled with the memory 156 to perform various algorithms for instructing the robotic limb 102 to perform different operations. Such programs or instructions executed by the processor(s) 154 may be stored in any suitable article of manufacture that includes one or more tangible, computer-readable media at least collectively storing the instructions or routines, such as the memory 156. The memory 156 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 154 to enable the robotic limb 102 to perform various functionalities.

In certain embodiments, the sensors 158 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 160 may include any number of electronic motors (e.g., DC motors) that may be utilized to drive actuators, which may allow the robotic limb 102 to perform various mechanical operations and/or motional operations (e.g., walking, head and neck motions, limb and joint motions, body motions, dance motions, eye motions, and so forth). The display 162 may include any display architecture (e.g., LCD, OLED, e-Ink, and so forth), which may provide further means by which users may interact and engage with the robotic limb 102.

In certain embodiments, the input structures 164 may include any physical structures utilized to control one or more global functions of the robotic limb 102 (e.g., pressing a button to power "ON" or power "OFF" the robotic limb 102). The network interface 166 may include, for example, any number of network interfaces suitable for allowing the robotic limb 102 to access and receive data over one or more cloud-based networks (e.g., a cloud-based service that may service hundreds or thousands of the robotic limb 102 and the associated users corresponding thereto) and/or distributed networks. The power source 168 may include any suitable source of power, such as a rechargeable lithium polymer (Li-poly) battery and/or an alternating current (AC) power converter that may be utilized to power and/or charge the robotic limb 102 for operation. Similarly, the I/O interface 170 may be provided to allow the robotic limb 102 to interface with various other electronic or computing devices, such as one or more auxiliary electronic devices.

In particular embodiments, the onboard computing system 152 may instruct the robotic limb 102 to achieve a desired pose. The onboard computing system 152 may access sensor data representing a scene from one or more sensors. These sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image based data (such as RFID data) may be used instead of, or in conjunction with, the image data. The sensor data may represent a scene that includes a least a portion of the robotic limb 102 that can thus be utilized by the computing device for various functions related to pose of the robotic limb 102. This disclosure contemplates that the one or more sensors can be located on the robotic limb 102 or external to the robotic limb 102, or both. Other sensors for sensing the pose of the robotic limb 102 may be built into the robotic system 100 of which the limb 102 is a part, and may include joint encoders, computation encoders, limit switches, motor current sensors, or any suitable combination thereof.

In particular embodiments, the onboard computing system 152 may isolate at least a portion of the sensor data that represents at least a portion of the robotic limb 102. As an example and not by way of limitation, this may be completed through a point cloud technique. In particular embodiments, the onboard computing system 152 may use 3D depth sensor data to record one or more snapshots of the point cloud of positional data points of the scene. These data points may include information about one or more external surfaces contained in the scene, including the external surfaces of the robotic limb 102, the table surface, and one or more objects contained in the scene. From this, the onboard computing system 152 may isolate a two-dimensional (2D) region that contains at least a portion of one or more objects contained within the scene. From at least a portion of the sensor data, the onboard computing system 152 may create one or more RGB-D clusters of various objects in the scene. In particular embodiments, the one or more RGB-D clusters of various objects includes the robotic limb 102 contained within the scene.

In particular embodiments, the scene may contain one or more objects that are further isolated by the onboard computing system 152. Upon isolating the one or more objects in the scene, the onboard computing system 152 may classify the one or more RGB-D clusters of various objects in the scene created from the portion of the sensor data. This classification may be conducted by the onboard computing system 152 via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification may determine that at least one of the one or more objects within a scene is a robotic limb 102. In particular embodiments, the onboard computing system 152 may additionally classify other objects contained within a scene, including for example but not by way of limitation, a coffee mug, a bottle, a vase, a spoon, a plate, a screwdriver, a light bulb, a hand or arm, etc.

While the present embodiments may be discussed below primarily with respect to a robotic limb, it should be appreciated that the present techniques may be applied to any of various robotic devices that may perform various operations to provide services to users. In particular embodiments, the robotic device may comprise any electronic device or computing device that may be configured with computer-based intelligence (e.g., machine learning [ML], artificial intelligence [AI], deep learning, cognitive computing, artificial neural networks [ANN], and so forth), which may be utilized by the robotic device to perform operations to provide services to users through, for example, motions, actions, gestures, body movements, facial expressions, limb and joint motions, display changes, lighting, sounds, and so forth. For example, in one embodiment, a robotic device may include a robot, a robotic limb, or similar AI or cognitive computing device that may be provided to contextually interact, instruct, operate, and engage with (e.g., in real-time or near real-time), for example, humans, pets, other robotic electronic devices, one or more servers, one or more cloud-based services, home appliances, electronic devices, automobiles, and so forth. Furthermore, as used herein, a robotic device may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

Automated System Tuning

In particular embodiments, the disclosed technology includes a system for automated system tuning. The automated system tuning may be used for robotic systems. As an example and not by way of limitation, the automated system tuning may be used for a robotic limb of a robotic system. In particular embodiments, robotic systems may be the interface between a planned or desired action and the command sent to the physical actuators that produce motion. In particular embodiments, the robotic system controllers may receive a desired action or state as input and produce an output which is sent to the actuators to achieve the desired action or state. In particular embodiments, the robotic system controllers may vary drastically in their capabilities and complexity, where more complex robotic system controllers may have a larger number of configuration parameters. In particular embodiments, the values of the configuration parameters may need to be tuned according to the characteristics of the robotic system in order to achieve the desired results. As an example and not by way of limitation, if a component of a robotic system is not properly tuned, then the specific component may not perform to achieve the desired results, such as an actuator that is lagging behind other actuators of the robotic system. This may cause other components to fail to achieve the desired results as intended. For instance, if the robotic system is attempting to perform a high-precision task, each of the components may need to achieve their exact desired result in order to perform the task. In particular embodiments, a robotic system may use robotic planning software to determine a desired trajectory for a robotic system to perform. The desired trajectory may be sent to a robotic system controller, which may generate driving commands to send to actuators and then send the driving commands to actuators to achieve the desired trajectory. In particular embodiments, to address the issue of tuning the parameters, an automatic tuning controller may be used. In particular embodiments, a robotic system controller may be embodied as an automatic tuning controller. In particular embodiments, an automatic tuning controller may be developed for a specific control algorithm. In particular embodiments, the automatic tuning controller may contain the required processes to measure relevant robot characteristics and determine the required control configuration parameters of the control algorithm. In particular embodiments, the controller may be developed specifically for a type of robot or joint. In particular embodiments, the automatic tuning controller may access data corresponding to a particular robotic system. As an example and not by way of limitation, the automatic tuning controller may use a robot model number to determine control configuration parameters by identifying a set of components specific to that robot model. The robot model may also include robot information and indicate the positions and orientations of the robotic system's joints to each other. In particular embodiments, each control algorithm may have a different set of parameters. In particular embodiments, the robotic system controller may include a proportional-integral-derivative (PID) controller, which has three terms and three configuration parameters. In particular embodiments, the control algorithm may be defined as $$u_{(t)} = k_p e_{(t)} + k_i \int_0^t e_{(t')} dt' + k_d \frac{de_{(t)}}{dt}.$$

In particular embodiments, $u_{(t)}$ may define the output of the control algorithm. In particular embodiments, $e_{(t)}$ may define the error, which is the difference between desired state and actual state (e.g., desired state—actual state). In particular embodiments, the state may be embodied as one or more of position, duty cycle, current, velocity, acceleration, temperature, and other state values. In particular embodiments, the proportional term may be defined by $k_p e(t)$. In particular embodiments, the integral term may be defined by $k_i \int e(t')dt'$. In particular embodiments, the derivative term may be defined by $$k_d \frac{de(t)}{dt}.$$

In particular embodiments, tuning a PID controller may require determining the values of the three configuration parameters $k_p$, $k_i$, and $k_d$, which may be determined as described herein. Although this disclosure describes automated system tuning in a particular manner, this disclosure contemplates automated system tuning in any suitable manner.

Certain technical challenges exist for system tuning. One technical challenge may include that system tuning may be very time-consuming to determine the values and the time only increases as the control system becomes more complex, as is the case for robotic systems. Another technical challenge may be that system tuning is prohibitively expensive and impractical as actuator characteristics change (e.g., from mechanical wear, cleaning, replacement of components) because these actuators may require re-tuning every time the characteristics change. Another challenge to system tuning may be the requirement of specific expertise, such as a control systems engineer to oversee the task of tuning the control system, which may incur further costs to maintain the control system. A solution presented by the embodiments disclosed herein to address these challenges may be to implement an automated tuning controller, which may calculate tuning parameters to update the parameters of the components of the robotic system. The automated tuning controller may be able to measure characteristics of a robotic system and translate these measurements into control system configuration parameters and automatically tune the control system as described herein. By automatically tuning the control system, the automated tuning controller may reduce the burden of control system tuning and allow tuning to be conducted quickly without specific expertise. In particular embodiments, an advantage of the automatic tuning controller may include automated measurements of robot characteristics (e.g., measurements of actuators) without any additional measurement equipment. In particular embodiments, another advantage of the automatic tuning controller may include mapping the measured robot characteristics to values of the control configuration parameters to achieve automatic tuning. While this disclosure discloses processes in context of a robotic control system, this disclosure contemplates utilizing these processes in context of other control systems. Certain embodiments disclosed herein may provide none, some, or all of the above technical advantages. One or more other technical advantages may be readily apparent to one skilled in the art in view of the figures, descriptions, and claims of the present disclosure.

In particular embodiments, a robotic system may send driving commands to one or more components of the robotic system. In particular embodiments, the robotic system may use an automatic tuning controller to send one or more driving commands to one or more actuators of the robotic system. In particular embodiments, the robotic system may set a duty cycle for a driving command to an actuator. In particular embodiments, the robotic system may set an initial duty cycle for a driving command to an actuator. The robotic system may change the duty cycle of the driving command to the actuator. The robotic system may update the duty cycle after performing one or more measurements on a component (e.g., actuators) of the robotic system as described herein. In particular embodiments, the robotic system may send a driving command to an actuator to move the actuator from an initial pose to a predetermined pose. Although this disclosure describes sending driving commands to components of a robotic system in a particular manner, this disclosure contemplates sending driving commands to components of a robotic system in any suitable manner.

In particular embodiments, the robotic system may perform one or more measurements of an actual state of a component of the robotic system. In particular embodiments, the robotic system may perform, for each actuator of the robotic system, one or more measurements of an actual state of the respective actuator in response to sending the driving commands to the actuators. In particular embodiments, the actual state that is being measured may be a pose of the component. As an example and not by way of limitation, the robotic system may measure an actual pose of an actuator after sending a driving command to the respective actuator. In particular embodiments, the robotic system may determine whether an actuator has moved from an initial pose based on the one or more measurements in response to setting a duty cycle for a driving command for the respective actuator. In particular embodiments, the robotic system may increase a duty cycle of a driving command for an actuator in response to determining the respective actuator has not moved from an initial pose. In particular embodiments, the robotic system may decease a duty cycle of a driving command for an actuator in response to determining the respective actuator has moved from an initial pose. In particular embodiments, the robotic system may iteratively decrease the duty cycle by a predetermined amount until a minimum duty cycle to maintain motion of an actuator is determined. Although this disclosure describes performing one or more measurements of an actual state of a component of a robotic system in a particular manner, this disclosure contemplates performing one or more measurements of an actual state of a component of a robotic system in any suitable manner.

In particular embodiments, the robotic system may generate a plurality of configuration parameters for an actuator based on the measurements taken. In particular embodiments, the robotic system may take the measurements performed on an actuator to calculate configuration parameters for that actuator. In particular embodiments, the configuration parameters may include a proportional gain parameter ($k_p$) and a strength of friction parameter ($k_f$). In particular embodiments, the robotic system may calculate the strength of friction parameter ($k_f$) of an actuator based on the minimum duty cycle to maintain motion for the respective actuator. In particular embodiments, the robotic system may set a value of a proportional gain parameter ($k_p$) for an actuator to a predetermined value. In particular embodiments, the robotic system may determine, responsive to driving an actuator to a predetermined pose, whether there is an overshoot past the predetermined pose based on the measurements performed. In particular embodiments, the robotic system may calculate, in response to determining there is the overshoot past the predetermined pose by an actuator, the proportional gain parameter ($k_p$) of the respective actuator by reducing the value of the proportional gain parameter ($k_p$) for the respective actuator by a predetermined factor. Although this disclosure describes generating a plurality of configuration parameters for an actuator in a particular manner, this disclosure contemplates generating a plurality of configuration parameters for an actuator in any suitable manner.

In particular embodiments, the robotic system may store the plurality of configuration parameters for one or more components of the robotic system in a data store of the robotic system. In particular embodiments, the robotic system may store the configuration parameters for one or more actuators of the robotic system in a data store of the robotic system. In particular embodiments, the robotic system may access the plurality of configuration parameters for the one or more actuators stored in a data store. In particular embodiments, the robotic system may execute a task for the one or more actuators based on a trajectory plan and the plurality of configuration parameters. In particular embodiments, the robotic system may use an operating controller to execute a task for the one or more actuators based on the trajectory plan and the plurality of configuration parameters. Although this disclosure describes storing a plurality of configuration parameters in a particular manner, this disclosure contemplates storing a plurality of configuration parameters in any suitable manner.

Figure 2A:
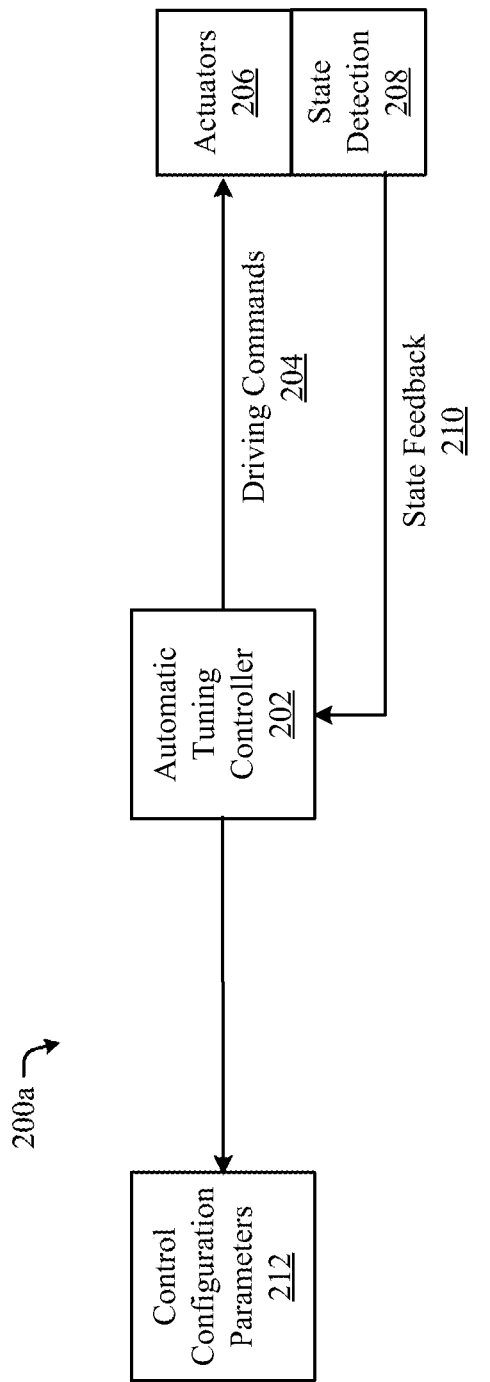
FIGS. 2A-2C illustrate example systems of automated system tuning.
Figure 2B:
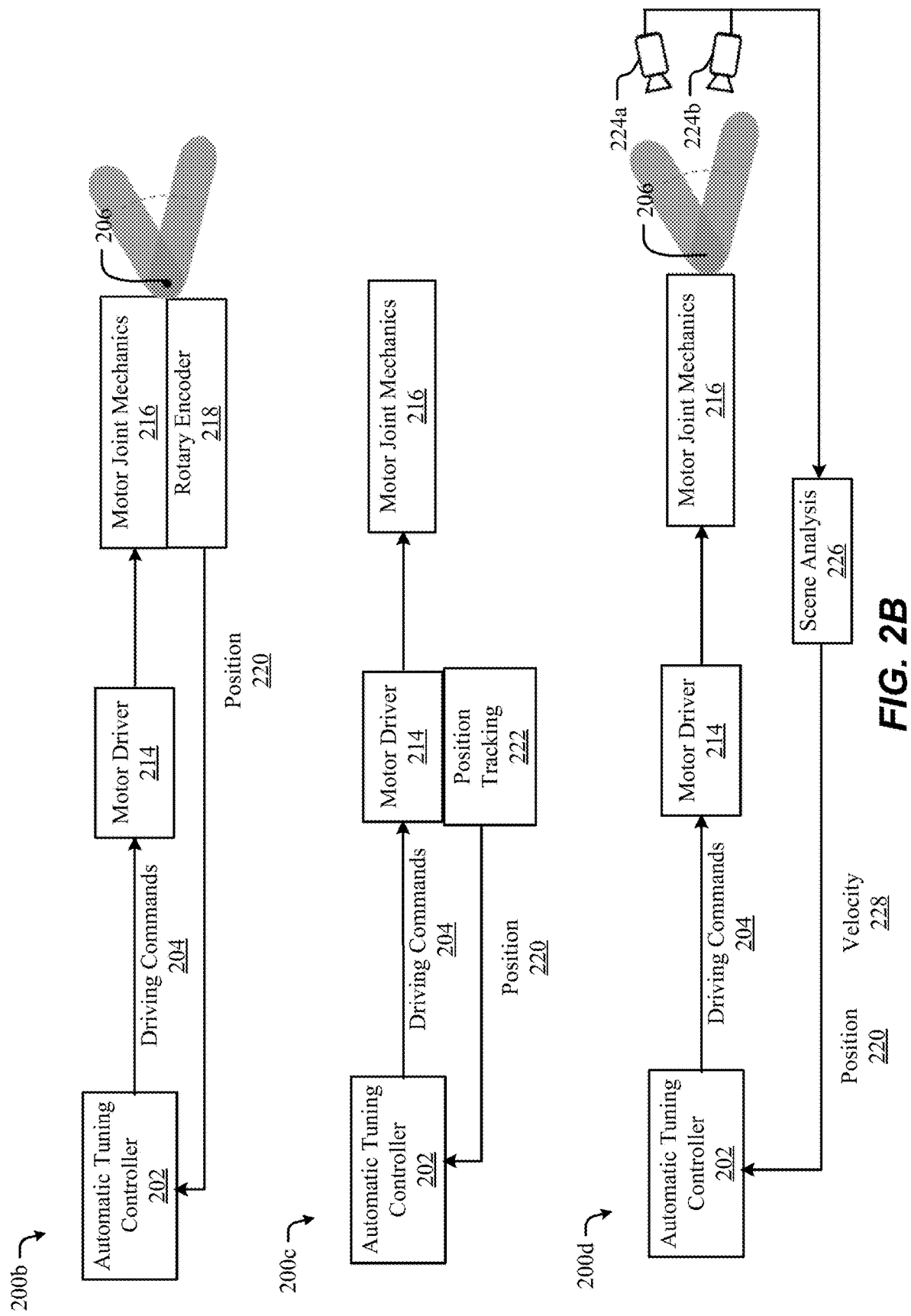
Figure 2C:
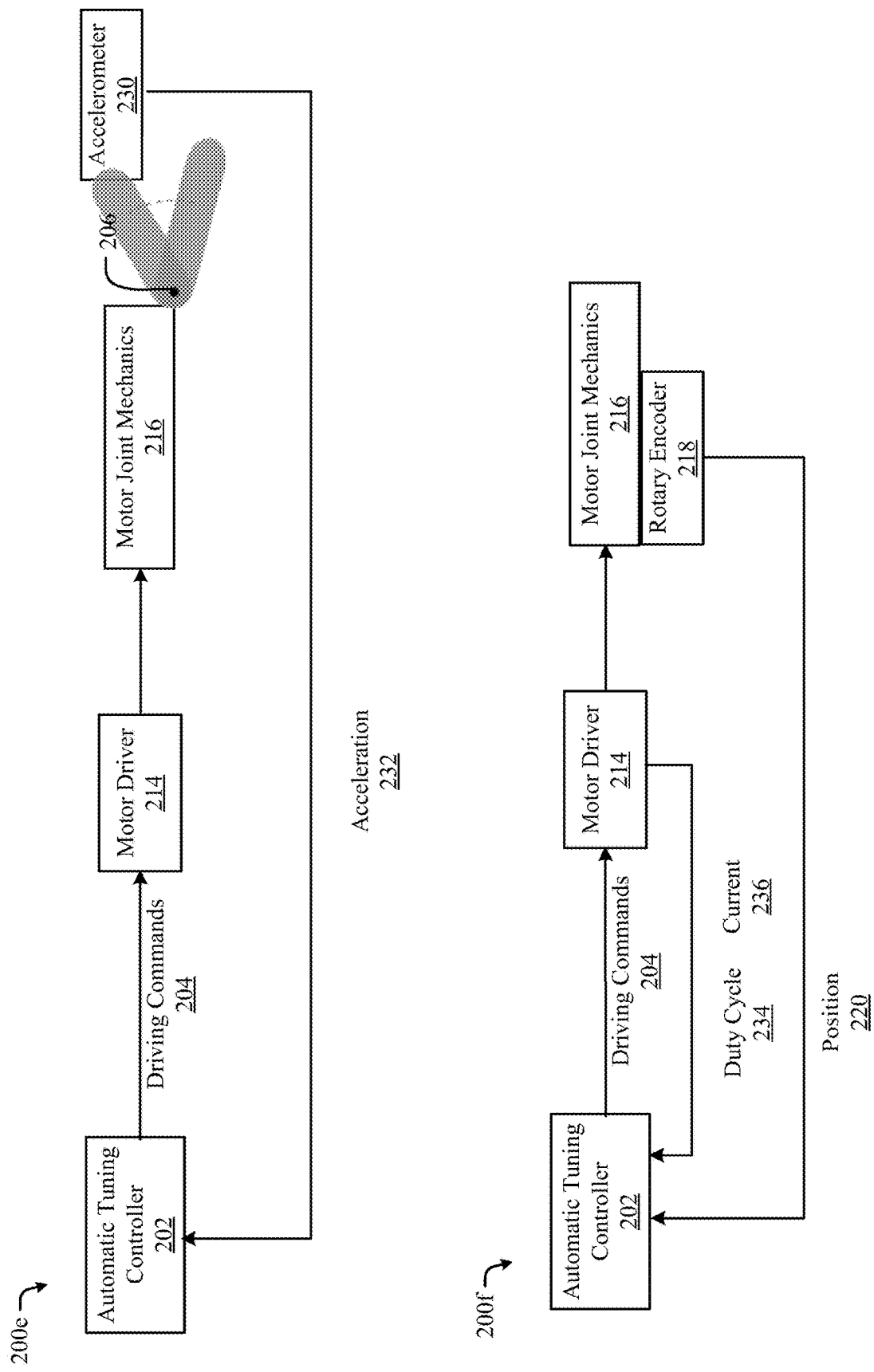

FIGS. 2A-2C illustrate example systems 200 of automated system tuning. Referring to FIG. 2A, an example system 200a of automated system tuning is shown. In particular embodiments, the example system 200a may be embodied as a robotic system 100 or as a component of a robotic system. In particular embodiments, the system 200a may include an automatic tuning controller 202, actuators 206, and a state detection module 208 coupled to the actuators 206. In particular embodiments, while a certain number of components are shown in a specific configuration, system 200a may include any number of components in any particular configuration. As an example and not by way of limitation, the system 200a may include two sets of actuators 206, each with its own state detection module 208. As another example and not by way of limitation, the state detection module 208 may be coupled to the automatic tuning controller 202 instead of the actuators 206. In particular embodiments, the system 200a may generate control configuration parameters 212. In particular embodiments, the automatic tuning controller 202 may send driving commands 204 to the actuators 206 as described herein. As an example and not by way of limitation, the automatic tuning controller 202 may send one or more driving commands 204 to each of the actuators 206. In particular embodiments, the state detection module 208 may perform one or more measurements on the actuators 206 in response to the automatic tuning controller 202 sending the driving commands 204 to the actuators 206. In particular embodiments, the state detection module 208 may generate state feedback 210 based on the performed measurements. The state feedback 210 may include data indicative of an actual state of the actuators 206. As an example and not by way of limitation, the state feedback 210 may include an actual pose of an actuator 206. The state feedback 210 may include data for each of the actuators 206. In particular embodiments, the automatic tuning controller 202 may use the state feedback 210 to perform calculations to generate one or more control configuration parameters 212 as described herein. In particular embodiments, the control configuration parameters 212 may be stored in a data store of the system 200a.

Referring to FIGS. 2B-2C, further example systems 200b-200f of automated system tuning are shown. Similarly to system 200a, each of the systems 200b-200f may be embodied as a robotic system or as a component of a robotic system and perform similar functions as system 200a. As an example and not by way of limitation, each of the systems 200b-200f may perform automated system tuning.

In particular embodiments, the system 200b may include an automatic tuning controller 202, a motor driver 214, motor joint mechanics 216, and an actuator 206 coupled to the motor joint mechanics 216 and a rotary encoder 218. In particular embodiments, the automatic tuning controller 202 may perform a tuning process that comprises a combination of sending a sequence of driving commands 204 to motor driver 214, waiting to receive state feedback 210 (e.g., position data 220), and generating control configuration parameters 212 (not shown) based on the state feedback 210. In particular embodiments, the automatic tuning controller 202 may send driving commands 204 to the motor driver 214. The motor driver 214 may use the driving commands to drive the motor joint mechanics 216. While only one actuator 206 is shown, the system 200b may include any number of actuators 206. In particular embodiments, the motor joint mechanics 216 may also include actuators. The rotary encoder 218 may monitor the motor joint mechanics 216 and the actuator 206 to generate position data 220. The position data 220 may indicate an actual pose of the actuator 206. The rotary encoder 218 may send the position data 220 to the automatic tuning controller 202. In particular embodiments, the automatic tuning controller 202 may send additional driving commands 204 and/or calculate one or more control configuration parameters 212 based on the tuning process as described herein. As an example and not by way of limitation, if the automatic tuning controller 202 is calculating a particular configuration parameter 212, the automatic tuning controller 202 may subsequently increase the duty cycle associated with the driving commands 204 to the motor driver 214 and wait to receive updated position data 220. In particular embodiments, after the automatic tuning controller 202 performs a tuning process, the automatic tuning controller 202 may generate/calculate control configuration parameters 212 as described herein. The automatic tuning controller 202 may store the control configuration parameters 212 in a data store of the system 200b.

In particular embodiments, the system 200c may include an automatic tuning controller 202, a motor driver 214, motor joint mechanics 216, and a position tracking module 222 coupled to the motor driver 214. In particular embodiments, the automatic tuning controller 202 may perform a tuning process that comprises a combination of sending a sequence of driving commands 204 to motor driver 214, waiting to receive state feedback 210 (e.g., position data 220), and generating control configuration parameters 212 (not shown) based on the state feedback 210. In particular embodiments, the automatic tuning controller 202 may send driving commands 204 to the motor driver 214. The motor driver 214 may use the driving commands to drive the motor joint mechanics 216. In particular embodiments, the motor joint mechanics 216 may include actuators. In particular embodiments, position tracking module 222 coupled to the motor driver 214 may monitor the motor driver 214 and generate position data 220 corresponding to the motor joint mechanics 216. The position data 220 may indicate an actual pose of an actuator of the motor joint mechanics 216. The position tracking module 222 may send the position data 220 to the automatic tuning controller 202. In particular embodiments, the automatic tuning controller 202 may send additional driving commands 204 and/or calculate one or more control configuration parameters 212 based on the tuning process as described herein. As an example and not by way of limitation, if the automatic tuning controller 202 is calculating a particular configuration parameter 212, the automatic tuning controller 202 may subsequently increase the duty cycle associated with the driving commands 204 to the motor driver 214 and wait to receive updated position data 220. In particular embodiments, after the automatic tuning controller 202 performs a tuning process, the automatic tuning controller 202 may generate/calculate control configuration parameters 212 as described herein. The automatic tuning controller 202 may store the control configuration parameters 212 in a data store of the system 200c.

In particular embodiments, the system 200d may include an automatic tuning controller 202, a motor driver 214, motor joint mechanics 216, an actuator 206 coupled to the motor joint mechanics 216, cameras 224a-224b, and a scene analysis module 226. In particular embodiments, the automatic tuning controller 202 may perform a tuning process that comprises a combination of sending a sequence of driving commands 204 to motor driver 214, waiting to receive state feedback 210 (e.g., position data 220, velocity data 228), and generating control configuration parameters 212 (not shown) based on the state feedback 210. In particular embodiments, the automatic tuning controller 202 may send driving commands 204 to the motor driver 214. The motor driver 214 may use the driving commands to drive the motor joint mechanics 216. While only one actuator 206 is shown, the system 200d may include any number of actuators 206. In particular embodiments, the motor joint mechanics 216 may also include actuators. In particular embodiments, when a limb segment 105 moves in response to the driving commands 204, the cameras 224a-224b may capture data corresponding to the movement. The data corresponding to the movement of the limb segment 105 may be sent to the scene analysis module 226. The scene analysis module 226 may analyze the received data and generate position data 220 and velocity data 228. The position data 220 may indicate an actual pose of the actuator 206 and the velocity data 228 may indicate an actual velocity corresponding to the actuator 206. The scene analysis module 226 may send the position data 220 and the velocity data 228 to the automatic tuning controller 202. In particular embodiments, the automatic tuning controller 202 may send additional driving commands 204 and/or calculate one or more control configuration parameters 212 based on the tuning process as described herein. As an example and not by way of limitation, if the automatic tuning controller 202 is calculating a particular configuration parameter 212, the automatic tuning controller 202 may subsequently increase the duty cycle associated with the driving commands 204 to the motor driver 214 and wait to receive updated position data 220 and/or velocity data 228. In particular embodiments, after the automatic tuning controller 202 performs a tuning process, the automatic tuning controller 202 may generate/calculate control configuration parameters 212 as described herein. The automatic tuning controller 202 may store the control configuration parameters 212 in a data store of the system 200d.

In particular embodiments, the system 200e may include an automatic tuning controller 202, a motor driver 214, motor joint mechanics 216, an actuator 206 coupled to the motor joint mechanics 216, and an accelerometer 230 coupled to a limb segment 105 corresponding to a joint associated with the actuator 206. In particular embodiments, the automatic tuning controller 202 may perform a tuning process that comprises a combination of sending a sequence of driving commands 204 to motor driver 214, waiting to receive state feedback 210 (e.g., acceleration data 232), and generating control configuration parameters 212 (not shown) based on the state feedback 210. In particular embodiments, the automatic tuning controller 202 may send driving commands 204 to the motor driver 214. The motor driver 214 may use the driving commands to drive the motor joint mechanics 216. While only one actuator 206 is shown, the system 200d may include any number of actuators 206. In particular embodiments, the motor joint mechanics 216 may also include actuators. In particular embodiments, when a limb segment 105 moves in response to the driving commands 204, the accelerometer 230 may capture acceleration data 232 corresponding to the movement. The acceleration data 232 may indicate an acceleration associated with the actuator 206. The accelerometer 230 may send the acceleration data 232 to the automatic tuning controller 202. In particular embodiments, the automatic tuning controller 202 may send additional driving commands 204 and/or calculate one or more control configuration parameters 212 based on the tuning process as described herein. As an example and not by way of limitation, if the automatic tuning controller 202 is calculating a particular configuration parameter 212, the automatic tuning controller 202 may subsequently increase the duty cycle associated with the driving commands 204 to the motor driver 214 and wait to receive updated acceleration data 232. In particular embodiments, after the automatic tuning controller 202 performs a tuning process, the automatic tuning controller 202 may generate/calculate control configuration parameters 212 as described herein. The automatic tuning controller 202 may store the control configuration parameters 212 in a data store of the system 200e.

In particular embodiments, the system 200f may include an automatic tuning controller 202, a motor driver 214, motor joint mechanics 216, and a rotary encoder 218 coupled to the motor joint mechanics 216. In particular embodiments, the automatic tuning controller 202 may perform a tuning process that comprises a combination of sending a sequence of driving commands 204 to motor driver 214, waiting to receive state feedback 210 (e.g., position data 220, duty cycle data 234, current data 236), and generating control configuration parameters 212 (not shown) based on the state feedback 210. In particular embodiments, the automatic tuning controller 202 may send driving commands 204 to the motor driver 214. The motor driver 214 may use the driving commands to drive the motor joint mechanics 216. In particular embodiments, the motor joint mechanics 216 may also include actuators. The rotary encoder 218 may monitor the motor joint mechanics 216 to generate position data 220. The position data 220 may indicate an actual pose of an actuator of the motor joint mechanics. The rotary encoder 218 may send the position data 220 to the automatic tuning controller 202. The motor driver 214 may send duty cycle data 234 and current data 236 to the automatic tuning controller 202. In particular embodiments, the automatic tuning controller 202 may send additional driving commands 204 and/or calculate one or more control configuration parameters 212 based on the tuning process as described herein. As an example and not by way of limitation, if the automatic tuning controller 202 is calculating a particular configuration parameter 212, the automatic tuning controller 202 may subsequently increase the duty cycle associated with the driving commands 204 to the motor driver 214 and wait to receive updated position data 220, duty cycle data 234, and current data 236. In particular embodiments, after the automatic tuning controller 202 performs a tuning process, the automatic tuning controller 202 may generate/calculate control configuration parameters 212 as described herein. The automatic tuning controller 202 may store the control configuration parameters 212 in a data store of the system 200f.

Figure 3:
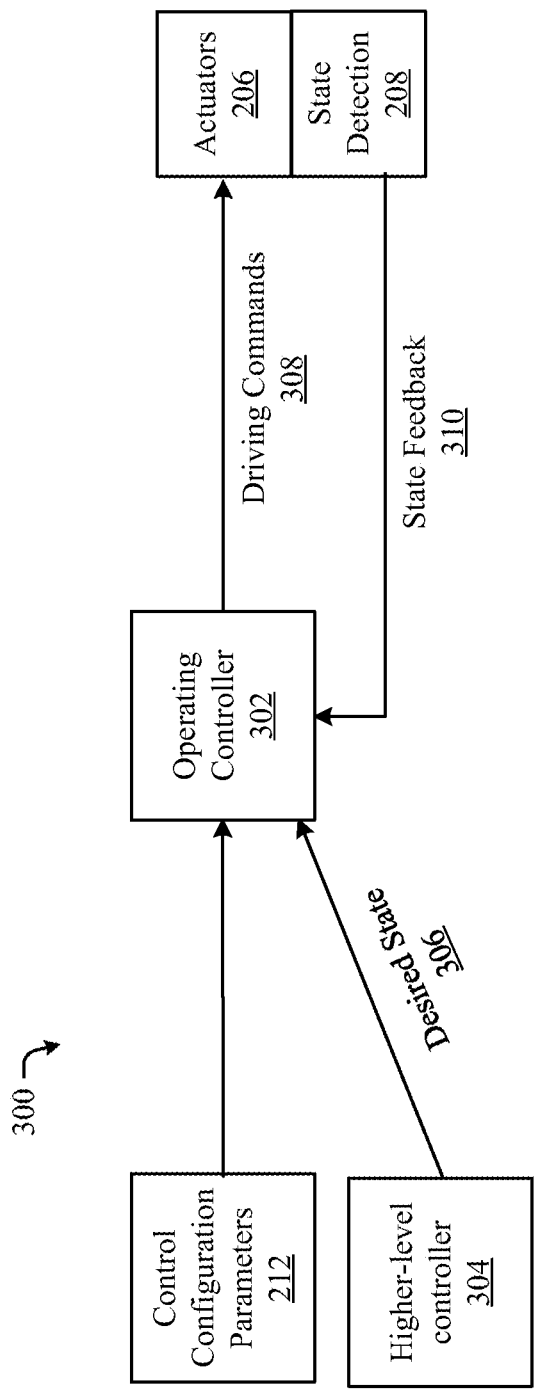
FIG. 3 illustrates an example system of an operating control system.

FIG. 3 illustrates an example system 300 of an operating control system. In particular embodiments, the system 300 may be embodied as a robotic system 100 or as a component of a robotic system. In particular embodiments, the system 300 may include an operating controller 302, a higher-level controller 304, actuators 206, and a state detection module 208 coupled to the actuators 206. In particular embodiments, while a certain number of components are shown in a specific configuration, system 300 may include any number of components in any particular configuration. As an example and not by way of limitation, the system 300 may include two sets of actuators 206, each with its own state detection module 208. As another example and not by way of limitation, the state detection module 208 may be coupled to the operating controller 302 instead of the actuators 206. In particular embodiments, the operating controller 302 may be used by the system 300 to perform a task. In particular embodiments, the higher-level controller 304 may receive a desired trajectory and generate a desired state 306 to send to the operating controller 302. The operating controller 302 may generate driving commands 308 based on the desired state 302 and received control configuration parameters 212. The operating controller 302 may access the control configuration parameters 212 from a data store of the system 300. In particular embodiments, the operating controller 302 may send the driving commands 308 to the actuators 206. The state detection module 208 may monitor the actuators 206 and generate state feedback 310. As an example and not by way of limitation, the state feedback 310 may include actual poses of the actuators 206. The state detection module 208 may send the state feedback 310 to the operating controller 302. The operating controller 302 may use the state feedback 310 to update driving commands 308 to send to the actuators 206.

Figure 4:
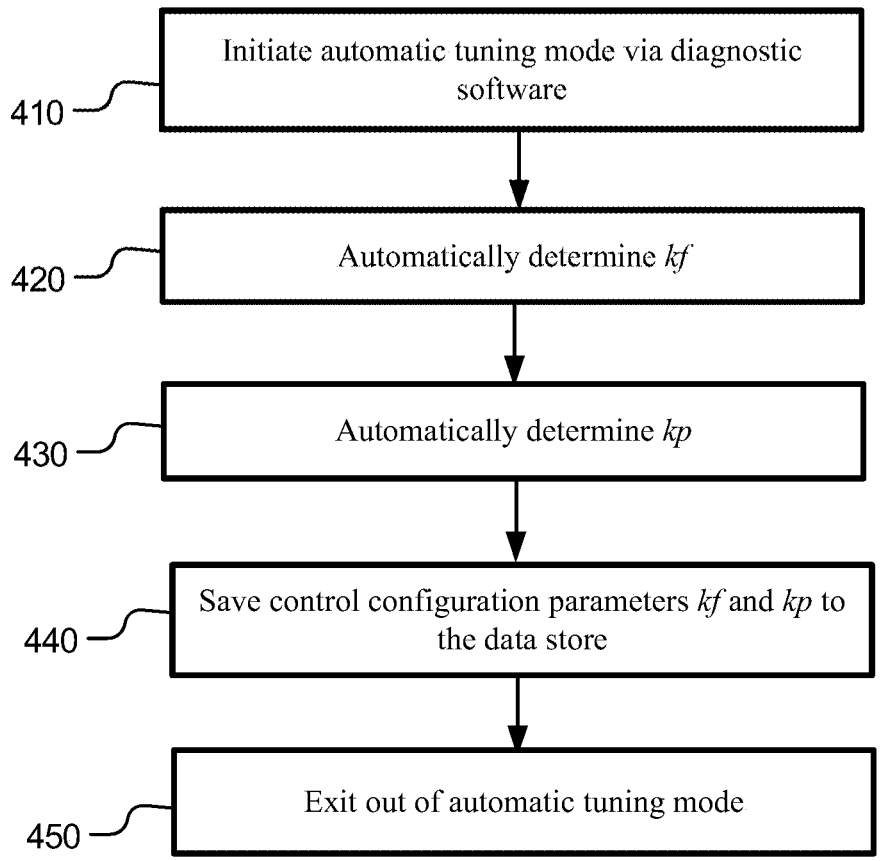
FIG. 4 illustrates an example flow diagram of automated system tuning.

FIG. 4 illustrates an example flow diagram of a process 400 of automated system tuning. In particular embodiments, the process 400 may be performed by a robotic system 100 as described herein. In particular embodiments, the process 400 may start at step 410 where a robotic system may initiate an automatic tuning mode via diagnostic software. In particular embodiments, the diagnostic software may indicate when to initiate an automatic tuning mode. As an example and not by way of limitation, the diagnostic software may determine a periodic cycle of when to initiate an automatic tuning mode. In particular embodiments, the robotic system may track times throughout the day where the robotic system is active and performing one or more tasks. The robotic system may identify downtimes where the robotic system is not active. In particular embodiments, the robotic system may relay the downtimes to the diagnostic software to identify times to initiate the automatic tuning mode. At step 420, the robotic system may automatically determine $k_f$ as shown in at least FIG. 5 and FIG. 6. At step 430, the robotic system may automatically determine $k_p$ as shown in at least FIG. 5 and FIG. 6. At step 440, the robotic system may save the control configuration parameters $k_f$ and $k_p$ to a data store of the robotic system. At step 450, after the conclusion of the tuning process, the robotic system may exit out of automatic tuning mode. Although this disclosure describes and illustrates particular steps of the process 400 of FIG. 4 as occurring in a particular order, this disclosure contemplates any suitable steps of the method of FIG. 4 occurring in any suitable order. Moreover, although this disclosure describes and illustrates an example process 400 for automated system tuning including the particular steps of the process 400 of FIG. 4, this disclosure contemplates any suitable method for automated system tuning including any suitable steps, which may include all, some, or none of the steps of the process 400 of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
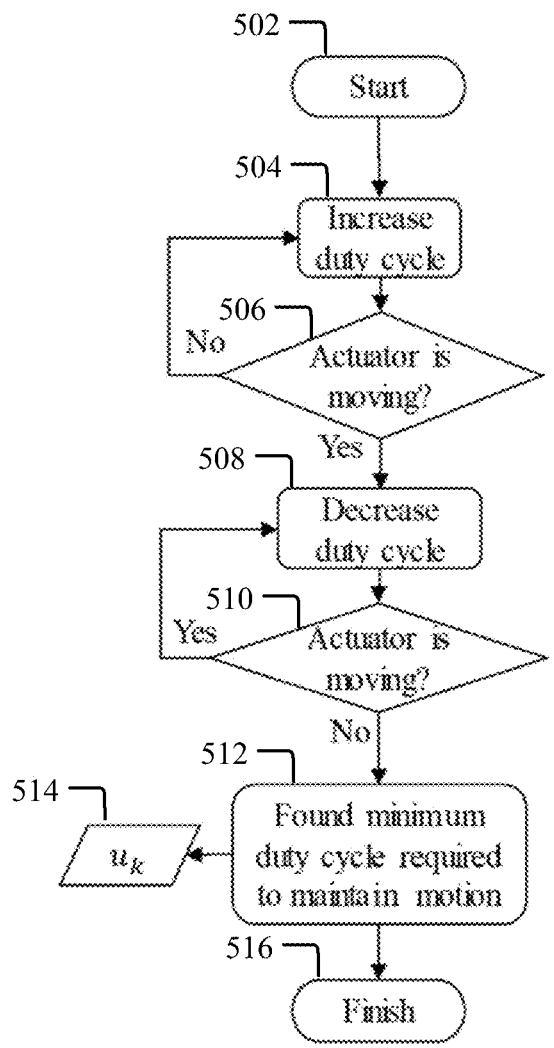
FIG. 5 illustrates an example flow diagram of a process of determining a configuration parameter.

FIG. 5 illustrates an example flow diagram of a process 500 of determining a configuration parameter. In particular embodiments, the process 500 may be performed by a robotic system 100 as described herein. In particular embodiments, the robotic system may perform the process 500 to calculate a control configuration parameter $k_f$ for a particular actuator of the robotic system. In particular embodiments, the process 500 may be used to measure a minimum duty cycle required to maintain motion denoted as $u_k$, which may be an approximate measure of the kinetic friction of the joint. In particular embodiments, the measurement of the joint characteristic $u_k$ may be mapped to the control configuration parameter $k_f$ The equation to map the two variables may be $k_f=u_k*0.9$. While a single actuator is discussed with respect to the process 500, the robotic system may perform the process 500 for each actuator of the robotic system. The process 500 may start at step 502 and continue to step 504 where a robotic system may increase a duty cycle of a driving command to actuator. At step 506, the robotic system may determine whether the actuator is moving. In particular embodiments, the robotic system may use one or more components to measure a current state of the actuator as described herein. As an example and not by way of limitation, the robotic system may use a rotary encoder 218 to determine an actual pose of the respective actuator. If the actuator is not moving, the process 500 may return to step 504 where the robotic system may incrementally increase the duty cycle of a driving command to the respective actuator. If the actuator is moving, the process 500 may proceed to step 508 where the robotic system may decrease the duty cycle of the driving command to the respective actuator. At step 510, the robotic system may determine whether the actuator is moving as described herein. If the actuator is moving, the process 500 may return to step 508 to incrementally decrease the duty cycle of the driving command to the respective actuator. If the actuator is not moving, the process may proceed to step 512, where the robotic system may determine the minimum duty cycle required to maintain the motion. The process 500 may generate the measurement of the joint characteristic $u_k$ at step 514. The process 500 may proceed to step 516 where the process 500 finishes. In particular embodiments, the robotic system may proceed to calculate the control configuration parameter $k_f$. The robotic system may store the control configuration parameter $k_f$. Although this disclosure describes and illustrates particular steps of the process 500 of FIG. 5 as occurring in a particular order, this disclosure contemplates any suitable steps of the method of FIG. 5 occurring in any suitable order. Moreover, although this disclosure describes and illustrates an example process 500 for determining a configuration parameter including the particular steps of the process 500 of FIG. 5, this disclosure contemplates any suitable method for determining a configuration parameter including any suitable steps, which may include all, some, or none of the steps of the process 500 of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
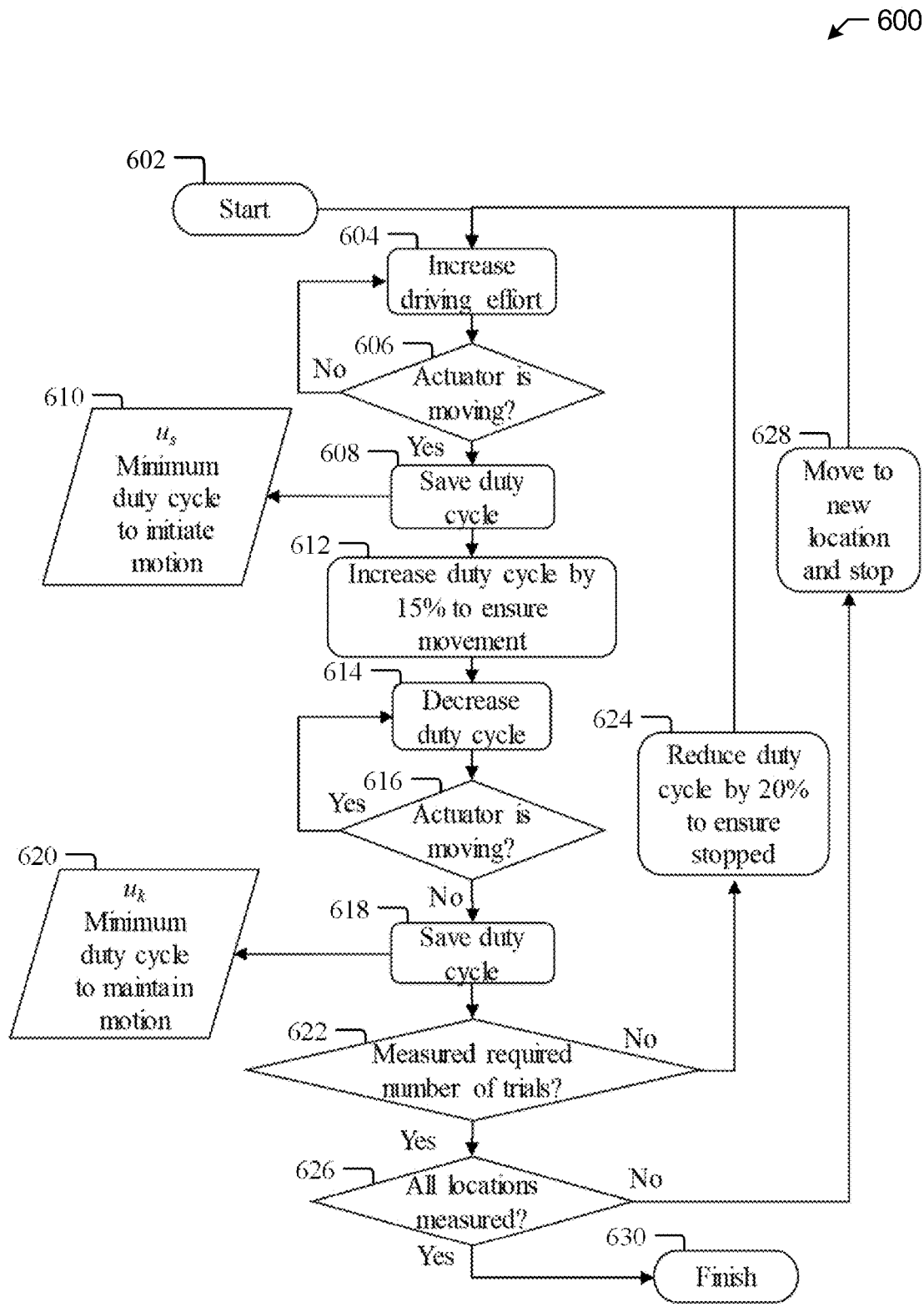
FIG. 6 illustrate another example flow diagram of a process of determining a configuration parameter.

FIG. 6 illustrates another example flow diagram of a process 600 of determining a configuration parameter. In particular embodiments, the process 600 may be performed by a robotic system 100 as described herein. In particular embodiments, the robotic system may perform the process 600 to calculate a control configuration parameter $k_f$ for a particular actuator. In particular embodiments, similarly to process 500, the process 600 may be used to measure a minimum duty cycle required to maintain motion denoted as $u_k$, which may be an approximate measure of the kinetic friction of the joint. In particular embodiments, the measurement of the joint characteristic $u_k$ may be mapped to the control configuration parameter $k_f$ as described herein. In particular embodiments, the process 600 may be used to determine the measurement of the joint characteristic $u_k$ of several locations of an actuator. While a single actuator is discussed with respect to the process 600, the robotic system may perform the process 600 for each actuator of the robotic system. The process 600 may start at step 602 and continue to step 604 where a robotic system may increase a driving effort to an actuator. In particular embodiments, the robotic system may send a driving command to the actuator. The initial driving command sent to an actuator may be a driving command of a predetermined duty cycle. At step 606, the robotic system may determine whether the actuator is moving as described herein. If the actuator is not moving, the process 600 may return to step 604 where the robotic system may incrementally increase the driving effort by increasing a duty cycle of a driving command sent to the respective actuator. The increase to the driving effort may be of a predetermined amount. If the actuator is moving, the process 600 may proceed to step 608 where the robotic system may save the duty cycle. The robotic system may generate the measurement of a minimum duty cycle to initiate motion $u_s$ at step 610. The measurement of a minimum duty cycle to initiate motion $u_s$ may be used for another control algorithm used by the robotic system. At step 612, the robotic system may increase the duty cycle of the driving command to the respective actuator by 15% to ensure movement. At step 614, the robotic system may decrease the duty cycle of the driving command to the respective actuator. At step 616, the robotic system may determine whether the actuator is moving as described herein. If the actuator is still moving, the process 600 may return to step 614, where the robotic system may incrementally decrease the duty cycle of the driving command to the respective actuator. If the actuator is not moving, the process 600 may proceed to step 618 where the robotic system may save the duty cycle of the driving command sent to the actuator. The robotic system may generate measurement of a minimum duty cycle to maintain motion $u_k$ at step 620. The robotic system may save the measurement of a minimum duty cycle to maintain motion $u_k$ for later calculations. The robotic system may differentiate each generation of the measurement of a minimum duty cycle to maintain motion $u_k$ as a separate trial measurement. At step 622, the robotic system may determine whether the robotic system has determined the measured required number of trials for that particular location. If the robotic system has not measured the required number of trials, then the process 600 may proceed to step 624 where the robotic system may reduce the duty cycle of the driving command to the respective actuator by 20% to ensure the actuator has stopped. In particular embodiments, the number of trials may be a predetermined number of trials. After step 624, the process may return to step 604 to repeat the trial for the location. If the robotic system has measured the required number of trials, then the process 600 proceeds to step 626, where the robotic system determines whether all locations of the actuator have been measured. In particular embodiments, the locations of an actuator to be measured may be predetermined. As an example and not by way of limitation, a first pose, a second pose, and a third pose may be locations which to measure the actuator. If the robotic system has not measured all the locations, the process 600 proceeds to step 628 where the robotic system sends a driving command to move the actuator to a new location and stop. After step 628, the process 600 may return to step 604 to repeat the process 600 for the new location. If the robotic system has determined the measurement of a minimum duty cycle to maintain motion $u_k$ at all locations, then the process 600 may proceed to step 630 and finish. In particular embodiments, the robotic system may accumulate several measurements of a minimum duty cycle to maintain motion $u_k$ for multiple locations. In particular embodiments, the robotic system may determine an average of all of the measurement of a minimum duty cycle to maintain motion $u_k$. The average measurement of a minimum duty cycle to maintain motion $u_k$ may be used to generate/calculate the control configuration parameter $k_f$. In particular embodiments, the robotic system may store the control configuration parameter $k_f$ in a data store. Although this disclosure describes and illustrates particular steps of the process 600 of FIG. 6 as occurring in a particular order, this disclosure contemplates any suitable steps of the method of FIG. 6 occurring in any suitable order. Moreover, although this disclosure describes and illustrates an example process 600 for determining a configuration parameter including the particular steps of the process 600 of FIG. 6, this disclosure contemplates any suitable method for determining a configuration parameter including any suitable steps, which may include all, some, or none of the steps of the process 600 of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
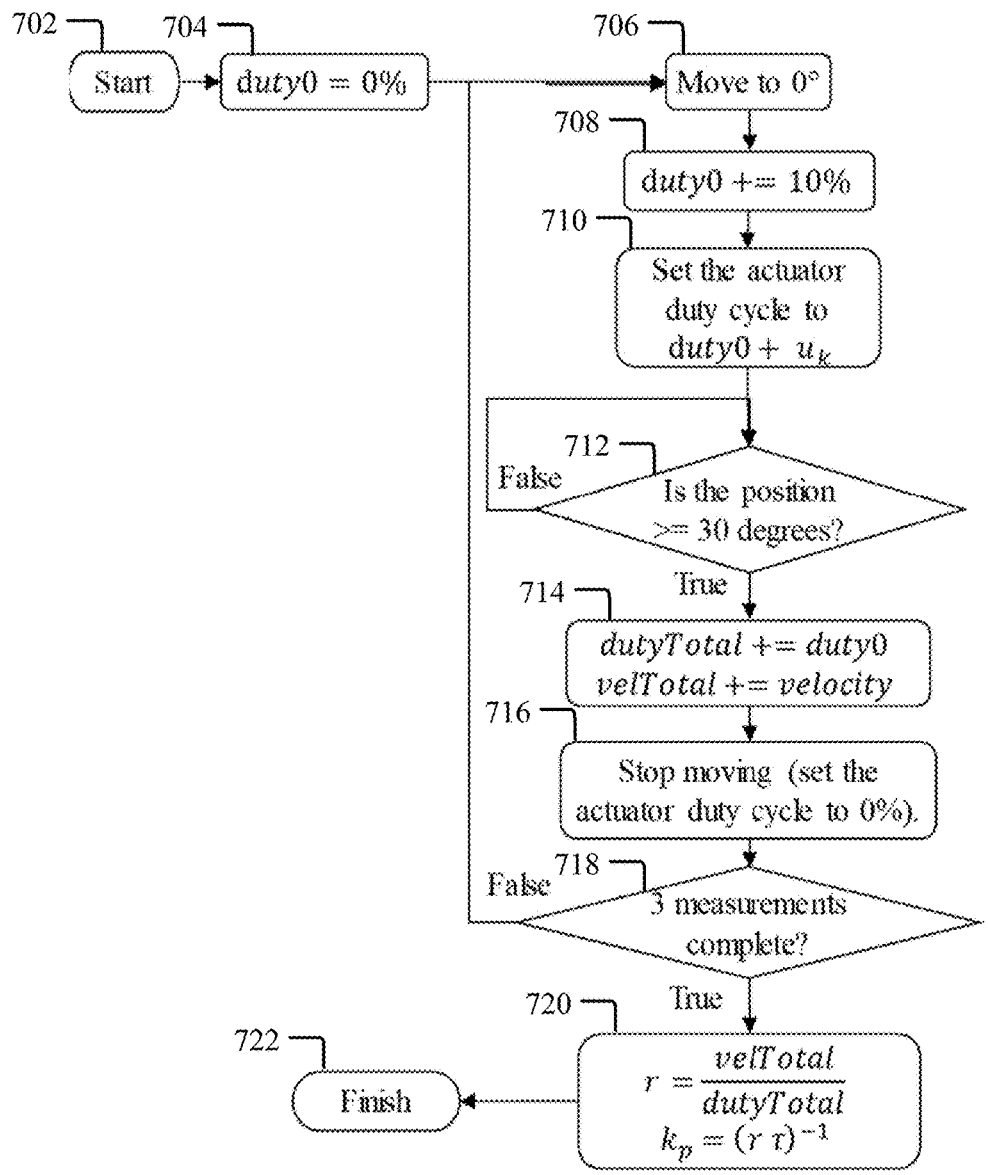
FIG. 7 illustrates an example flow diagram of a process of determining another configuration parameter.

FIG. 7 illustrates an example flow diagram of a process 700 of determining a configuration parameter. In particular embodiments, the process 700 may be performed by a robotic system 100 as described herein. In particular embodiments, the robotic system may perform the process 700 to calculate a control configuration parameter $k_p$ for a particular actuator of the robotic system. In particular embodiments, the process 700 may assume a change in the applied duty cycle results in a proportional change in velocity v, where r=Δvelocity/ΔdutyCycle=constant and v=r$(u_{(t)}-u_k)=rk_p e_{(t)}$. In particular embodiments, if the commanded position is changed to a new value, the position will trend from the starting position to the commanded position as an exponential decay function. The time constant of this movement may be equal to $\tau=(rk_p)^{-1}$. In particular embodiments, r can be determined via automated means, and the time constant τ can be easily chosen based on the application. τ=1 second may be appropriate for many robotic arm applications. Then, $k_p$ may be calculated with $k_p=(r\tau)^{-1}$. The process 700 may provide a simple method of automatically determining r and hence $k_p$ to meet the desired movement time. The process 700 may perform the same movement at three different duty cycles (e.g., 10%, 20%, and 30%), while measuring the velocity in order to determine a relationship between velocity and duty cycle r. The process 700 may start at step 702 and continue to step 704, where the robotic system may set an initial duty cycle (duty0) to 0%. At step 706, the robotic system may send a driving command to the actuator to move the actuator to a pose of 0°. At step 708, the robotic system may increase the duty cycle of duty0 by 10%. At step 710, the robotic system may set the actuator duty cycle (e.g., the duty cycle of the driving command to the actuator) to the duty0+$u_k$ (where $u_k$ is measured from the process 500 or 600). At step 712, the robotic system may determine whether the position of the actuator is >=30°. If the position of the actuator is not >=30°, then the process 700 may continue to check whether the position of the actuator is >=30°. If the position of the actuator is >=30°, then process 700 may proceed to step 714, where the robotic system may set a dutyTotal+=duty0 and velTotal+=velocity. At step 716, the robotic system may stop the actuator from moving by setting the duty cycle of the driving command to the actuator to 0%. At step 718, the robotic system may determine whether the robotic system has taken three measurements. If the robotic system has not yet taken three measurements, the process 700 may return to step 706 to restart that part of the process 700. If the robotic system has taken three measurements, the process 700 may proceed to step 720 where the robotic system may calculate $$r = \frac{velTotal}{dutyTotal}$$

and $k_p=(r\tau)^{-1}$. At step 722, the robotic system may conclude the process 700. In particular embodiments, the robotic system may save the control configuration parameter $k_p$ in a data store. Although this disclosure describes and illustrates particular steps of the process 700 of FIG. 7 as occurring in a particular order, this disclosure contemplates any suitable steps of the method of FIG. 7 occurring in any suitable order. Moreover, although this disclosure describes and illustrates an example process 700 for determining a configuration parameter including the particular steps of the process 700 of FIG. 7, this disclosure contemplates any suitable method for determining a configuration parameter including any suitable steps, which may include all, some, or none of the steps of the process 700 of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
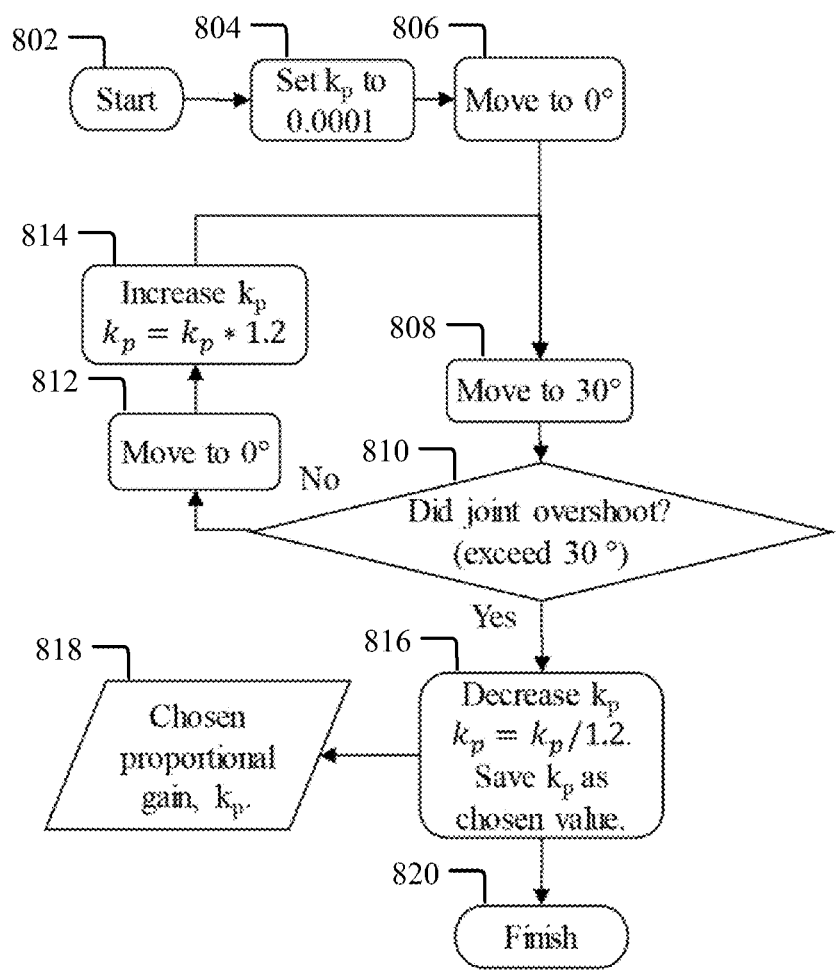
FIG. 8 illustrate another example flow diagram of a process of determining another configuration parameter.

FIG. 8 illustrates another example flow diagram of a process 800 of determining a configuration parameter. In particular embodiments, the process 800 may be performed by a robotic system 100 as described herein. In particular embodiments, the robotic system may perform the process 800 to calculate a control configuration parameter $k_p$ for a particular actuator of the robotic system. In particular embodiments, the process 800 may start at step 802 and continue to step 804 where the robotic system may set the control configuration parameter $k_p$ to 0.0001. At step 806, the robotic system may send a driving command to the actuator being measured to move the respective actuator to an initial pose of 0°. At step 808, the robotic system may send a driving command to move the actuator to a position corresponding to 30°. At step 810, the robotic system may determine whether the actuator overshot the desired pose of 30°. If the actuator did not overshoot the desired pose, then the process 800 may proceed to step 812, where the robotic system may send a driving command to the actuator to return the actuator back to 0°. The process 800 proceeds to step 814, where the robotic system may increase $k_p$ by a predetermined factor. In particular embodiments, $k_p$ may be increased using the equation $k_p = k_p * 1.2$. The process 800 may return to step 808 after step 814. If the actuator did overshoot the desired pose, the process 800 may proceed to step 816, where the robotic system may decrease $k_p$. In particular embodiments, $k_p$ may be decreased using the equation $k_p = k_p / 1.2$. The value of $k_p$ may be saved and chosen as the control configuration parameter $k_p$. At step 818, the robotic system may generate the chosen proportional gain $k_p$. The process 800 may conclude at step 820. In particular embodiments, the robotic system may save the proportional gain $k_p$. Although this disclosure describes and illustrates particular steps of the process 800 of FIG. 8 as occurring in a particular order, this disclosure contemplates any suitable steps of the method of FIG. 8 occurring in any suitable order. Moreover, although this disclosure describes and illustrates an example process 800 for determining a configuration parameter including the particular steps of the process 800 of FIG. 8, this disclosure contemplates any suitable method for determining a configuration parameter including any suitable steps, which may include all, some, or none of the steps of the process 800 of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
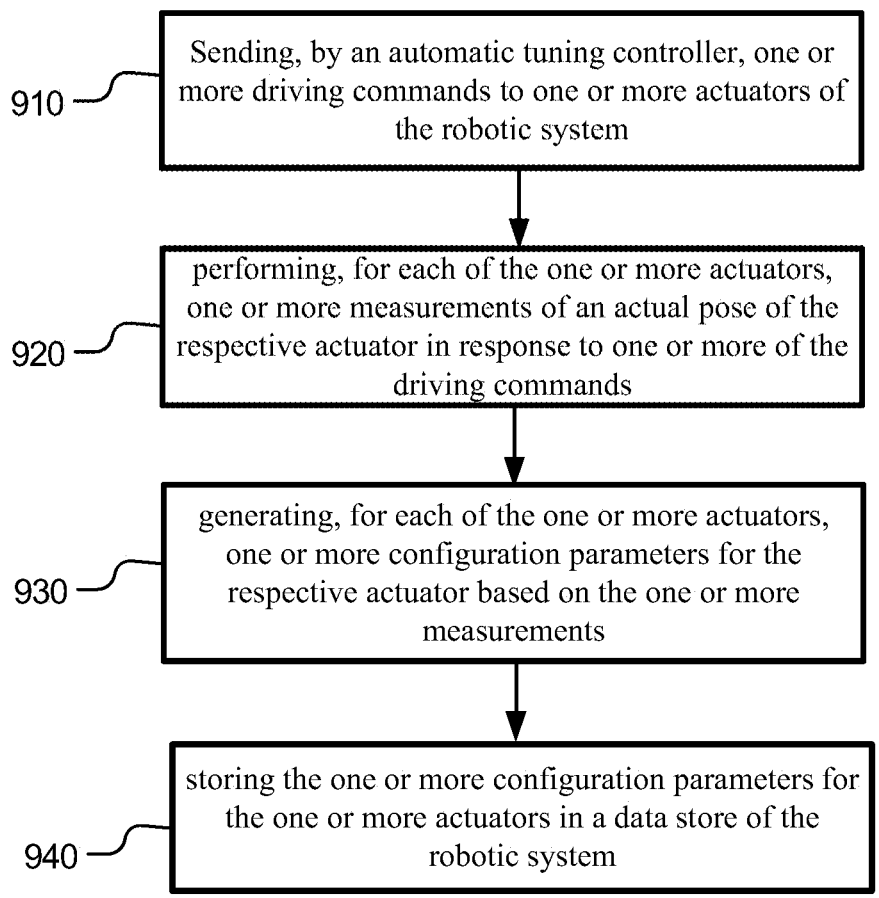
FIG. 9 illustrates an example method for automated system tuning.

FIG. 9 illustrates is a flow diagram of a method for automated system tuning, in accordance with the presently disclosed embodiments. The method 900 may be performed utilizing one or more processing devices (e.g., robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 900 may begin at step 910 with the one or more processing devices (e.g., robotic system 100) sending, by an automatic tuning controller, one or more driving commands to one or more actuators of the robotic system. The method 900 may then continue at step 920 with the one or more processing devices (e.g., robotic system 100) performing, for each of the one or more actuators, one or more measurements of an actual pose of the respective actuator in response to one or more of the driving commands. The method 900 may then continue at step 930 with the one or more processing devices (e.g., robotic system 100) generating, for each of the one or more actuators, one or more configuration parameters for the respective actuator based on the one or more measurements. As an example and not by way of limitation, the configuration parameters may comprise a proportional gain parameter ($k_p$) and a strength of friction parameter ($k_f$). The method 900 may then continue at block 940 with the one or more processing devices (e.g., robotic system 100) storing the one or more configuration parameters for the one or more actuators in a data store of the robotic system. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for automated system tuning including the particular steps of the method of FIG. 9, this disclosure contemplates any suitable method for automated system tuning including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Systems and Methods

Figure 10:
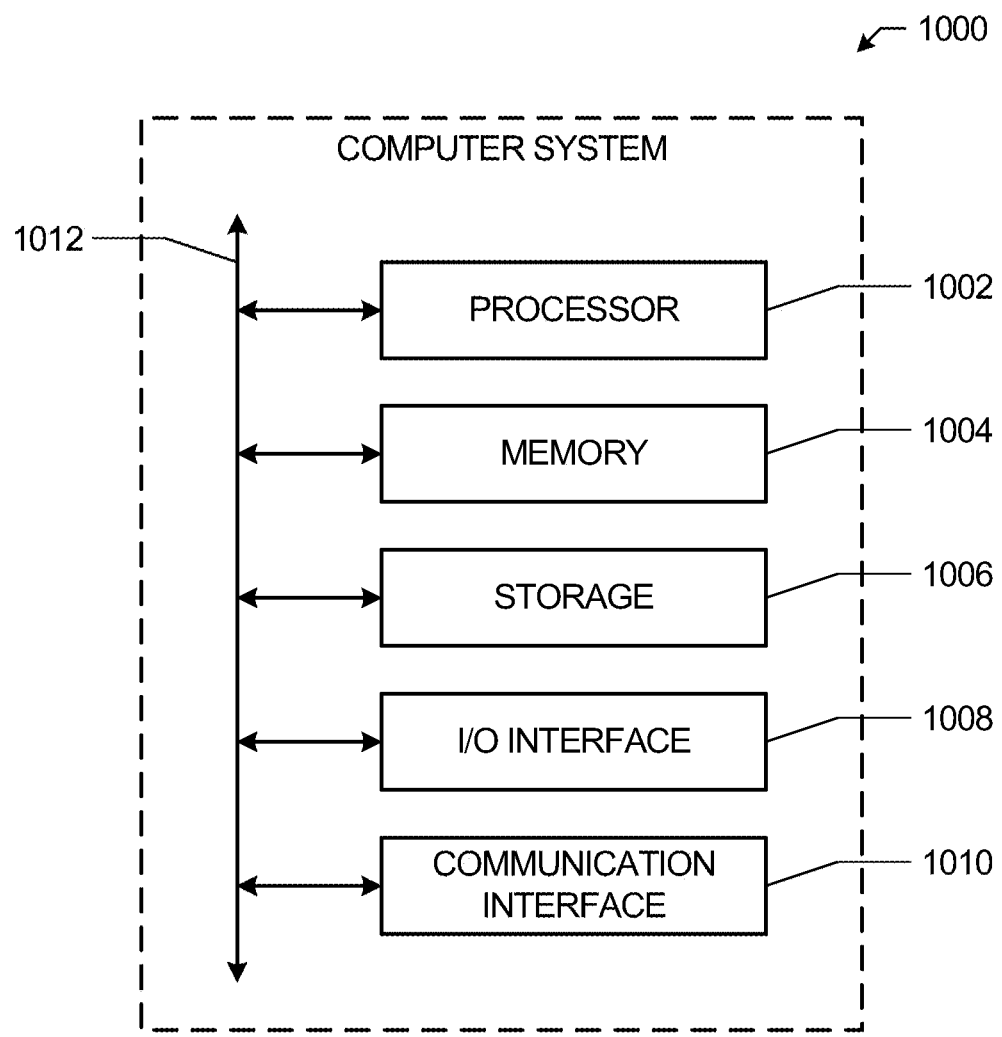
FIG. 10 illustrates an example computer system.

FIG. 10 illustrates an example computer system 1000 that may be utilized to perform automated system tuning, in accordance with the presently disclosed embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement. In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memory devices 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1006 for them. Where appropriate, I/O interface 1008 may include one or more device or software drivers enabling processor 1002 to drive one or more of these I/O devices. I/O interface 1008 may include one or more I/O interfaces 1006, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it.

As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

AI Architecture

Figure 11:
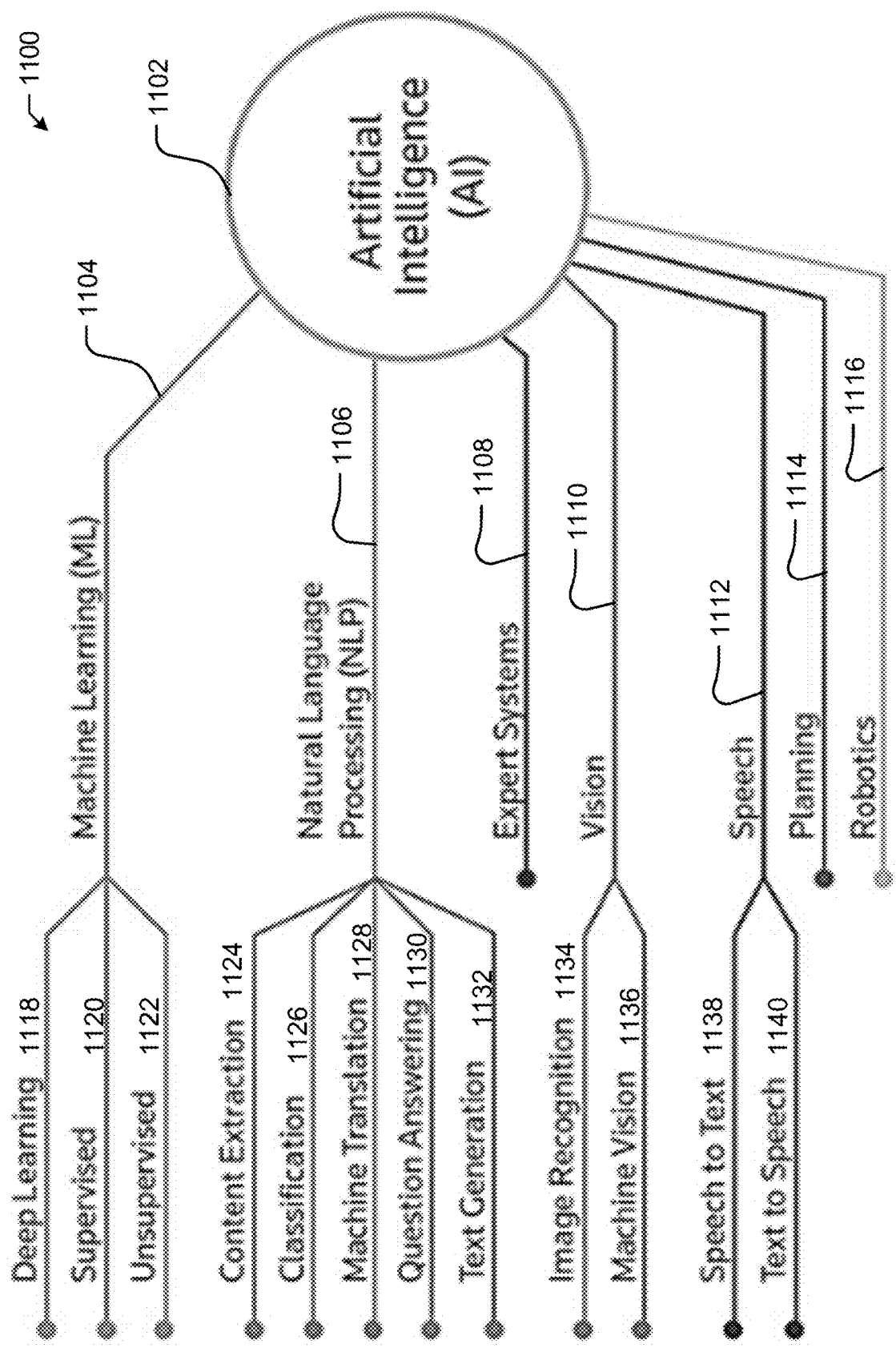
FIG. 11 illustrates a diagram of an example artificial intelligence (AI) architecture.

FIG. 11 illustrates a diagram 1100 of an example artificial intelligence (AI) architecture 1102 that may be utilized to perform automated system tuning, in accordance with the presently disclosed embodiments. In particular embodiments, the AI architecture 1102 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 11, the AI architecture 1102 may include machine leaning (ML) algorithms and functions 1104, natural language processing (NLP) algorithms and functions 1106, expert systems 1108, computer-based vision algorithms and functions 1110, speech recognition algorithms and functions 1112, planning algorithms and functions 1114, and robotics algorithms and functions 1116. In particular embodiments, the ML algorithms and functions 1104 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1104 may include deep learning algorithms 1118, supervised learning algorithms 1120, and unsupervised learning algorithms 1122.

In particular embodiments, the deep learning algorithms 1118 may include any artificial neural networks (ANNs) that may be utilized to learn deep levels of representations and abstractions from large amounts of data. For example, the deep learning algorithms 1118 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1120 may include any algorithms that may be utilized to apply, for example, what has been learned in the past to new data using labeled examples for predicting future events. For example, starting from the analysis of a known training dataset, the supervised learning algorithms 1120 may produce an inferred function to make predictions about the output values. The supervised learning algorithms 1120 can also compare its output with the correct and intended output and find errors in order to modify the supervised learning algorithms 1120 accordingly. On the other hand, the unsupervised learning algorithms 1122 may include any algorithms that may applied, for example, when the data used to train the unsupervised learning algorithms 1122 are neither classified or labeled. For example, the unsupervised learning algorithms 1122 may study and analyze how systems may infer a function to describe a hidden structure from unlabeled data.

In particular embodiments, the NLP algorithms and functions 1106 may include any algorithms or functions that may be suitable for automatically manipulating natural language, such as speech and/or text. For example, in particular embodiments, the NLP algorithms and functions 1106 may include content extraction algorithms or functions 1124, classification algorithms or functions 1126, machine translation algorithms or functions 1128, question answering (QA) algorithms or functions 1130, and text generation algorithms or functions 1132. In particular embodiments, the content extraction algorithms or functions 1124 may include a means for extracting text or images from electronic documents (e.g., webpages, text editor documents, and so forth) to be utilized, for example, in other applications.

In particular embodiments, the classification algorithms or functions 1126 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1128 may include any algorithms or functions that may be suitable for automatically converting source text in one language, for example, into text in another language. The QA algorithms or functions 1130 may include any algorithms or functions that may be suitable for automatically answering questions posed by humans in, for example, a natural language, such as that performed by voice-controlled personal assistant devices. The text generation algorithms or functions 1132 may include any algorithms or functions that may be suitable for automatically generating natural language texts.

In particular embodiments, the expert systems 1108 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1110 may include any algorithms or functions that may be suitable for automatically extracting information from images (e.g., photo images, video images). For example, the computer-based vision algorithms and functions 1110 may include image recognition algorithms 1134 and machine vision algorithms 1136. The image recognition algorithms 1134 may include any algorithms that may be suitable for automatically identifying and/or classifying objects, places, people, and so forth that may be included in, for example, one or more image frames or other displayed data. The machine vision algorithms 1136 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1112 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1138 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1140 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a robotic system:
for each of a plurality of actuator locations for each of one or more actuators of the robotic system:
sending, by an automatic tuning controller, one or more driving commands to the one or more actuators of the robotic system;
performing, for each of the one or more actuators, one or more measurements of a motion of the respective actuator at the respective actuator location in response to one or more of the driving commands;
generating, for each of the one or more actuators, one or more location-based duty-cycle parameters for the respective actuator at the respective actuator location based on the one or more measurements;
for each of the one or more actuators, determining one or more final duty-cycle parameters, wherein each of the final duty-cycle parameters is based on each of the corresponding location-based duty-cycle parameters for the actuator locations of that respective actuator; and
storing the one or more final duty-cycle parameters for the one or more actuators in a data store of the robotic system.

2. The method of claim 1, further comprising performing, for each of the one or more actuators, one or more measurements of a position, a current, a velocity, an acceleration, or a temperature.

3. The method of claim 2, wherein the one or more measurements of claim 2 are performed at each of the plurality of actuator locations.

4. The method of claim 1, wherein the plurality of actuator locations comprise a predetermined number of actuator locations.

5. The method of claim 1, further comprising:
accessing the one or more final duty-cycle parameters for the one or more actuators stored in the data store of the robotic system; and
executing, by an operating controller, a task for the one or more actuators based on a trajectory plan and the one or more final duty-cycle parameters.

6. The method of claim 1, wherein the one or more final duty-cycle parameters comprises one or more of: a proportional gain parameter ($k_p$) or a strength of friction parameter ($k_f$).

7. The method of claim 6, further comprising, for each of the one or more actuators:
setting a duty cycle of a first driving command of the one or more driving commands to the respective actuator; and determining, responsive to setting the duty cycle, whether the respective actuator has moved from an initial pose based on the one or more measurements.

8. The method of claim 7, further comprising:
increasing the duty cycle of the first driving command in response to determining the respective actuator has not moved from the initial pose.

9. The method of claim 7, further comprising:
decreasing the duty cycle of the first driving command in response to determining the respective actuator has moved from the initial pose, wherein the duty cycle is decreased until a minimum duty cycle to maintain motion of the respective actuator is determined; and
calculating the strength of friction parameter ($k_f$) of the respective actuator based on the minimum duty cycle to maintain motion of the actuator.

10. The method of claim 6, further comprising, for each of the one or more actuators:
sending, by the automatic tuning controller, a first driving command to the respective actuator to move from an initial pose to a predetermined pose;
setting a duty cycle of the first driving command of the one or more driving commands to the respective actuator; and
determining, responsive to setting the duty cycle of the first driving command, whether the respective actuator overshot the predetermined pose.

11. The method of claim 10, further comprising:
setting, in response to determining that the respective actuator overshot the predetermined pose, the duty cycle to zero; and
calculating the proportional gain parameter ($k_p$) of the respective actuator based on a change constant and a time constant.

12. A robotic system comprising:
a computing system with control software;
a robot controller;
one or more robotic limbs;
one or more non-transitory computer-readable storage media including instructions; and
one or more processors coupled to the storage media, the one or more processors configured to execute the instructions to:
for each of a plurality of actuator locations for each of one or more actuators of the robotic system
send, by an automatic tuning controller, one or more driving commands to the one or more actuators of the robotic system;
perform, for each of the one or more actuators, one or more measurements of a motion of the respective actuator at the respective actuator location in response to one or more of the driving commands;
generate, for each of the one or more actuators, one or more location-based duty-cycle parameters for the respective actuator at the respective actuator location based on the one or more measurements; and
for each of the one or more actuators, determine one or more final duty-cycle parameters, wherein each of the final duty-cycle parameters is based on each of the corresponding location-based duty-cycle parameters for the actuator locations of that respective actuator; and
store the one or more final duty-cycle parameters for the one or more actuators in a data store of the robotic system.

13. The robotic system of claim 12, wherein the one or more processors are further configured to execute the instructions to perform, for each of the one or more actuators, one or more measurements of a position, a current, a velocity, an acceleration, or a temperature.

14. The robotic system of claim 13, wherein the one or more measurements of claim 13 are performed at each of the plurality of actuator locations.

15. The robotic system of claim 12, wherein the processors are further configured to execute the instructions to:
   access the one or more final duty-cycle parameters for the one or more actuators stored in the data store of the robotic system; and
   execute, by the robot controller, a task for the one or more actuators based on a trajectory plan and the one or more final duty-cycle parameters.

16. The robotic system of claim 12, wherein the one or more final duty-cycle parameters comprises one or more of: a proportional gain parameter ($k_p$) or a strength of friction parameter ($k_f$).

17. A computer-readable non-transitory storage media comprising instructions executable by a processor of a robotic system to:
   for each of a plurality of actuator locations for each of one or more actuators of the robotic system
      send, by an automatic tuning controller, one or more driving commands to the one or more actuators of the robotic system;
      perform, for each of the one or more actuators, one or more measurements of a motion of the respective actuator at the respective actuator location in response to one or more of the driving commands;
      generate, for each of the one or more actuators, one or more location-based duty-cycle parameters for the respective actuator at the respective actuator location based on the one or more measurements; and
   for each of the one or more actuators, determine one or more final duty-cycle parameters, wherein each of the final duty-cycle parameters is based on each of the corresponding location-based duty-cycle parameters for the actuator locations of that respective actuator; and
   store the one or more final duty-cycle parameters for the one or more actuators in a data store of the robotic system.

18. The media of claim 17, wherein the media further comprises instructions executable by the processor to perform, for each of the one or more actuators, one or more measurements of a position, a current, a velocity, an acceleration, or a temperature.

19. The media of claim 18, wherein the one or more measurements of claim 18 are performed at each of the plurality of actuator locations.

20. The media of claim 17, wherein the instructions are further executable by the processor to:
   access the one or more final duty-cycle parameters for the one or more actuators stored in the data store of the robotic system; and
   execute, by an operating controller, a task for the one or more actuators based on a trajectory plan and the one or more final duty-cycle parameters.

* * * * *